US008379968B2

(12) United States Patent
Do et al.

(10) Patent No.: US 8,379,968 B2
(45) Date of Patent: Feb. 19, 2013

(54) CONVERSION OF TWO DIMENSIONAL IMAGE DATA INTO THREE DIMENSIONAL SPATIAL DATA FOR USE IN A VIRTUAL UNIVERSE

(75) Inventors: Lydia M. Do, Raleigh, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 11/953,490

(22) Filed: Dec. 10, 2007

(65) Prior Publication Data

US 2009/0147003 A1 Jun. 11, 2009

(51) Int. Cl.
*G06K 9/00* (2006.01)
*G06K 9/36* (2006.01)

(52) U.S. Cl. .......... 382/154; 382/285; 345/419; 356/12; 348/42

(58) Field of Classification Search .................. 382/154, 382/285; 345/419–427; 356/12–14; 348/42–60
See application file for complete search history.

(56) References Cited

U.S. PATENT DOCUMENTS

| | | | | |
|---|---|---|---|---|
| 5,729,471 A * | 3/1998 | Jain et al. | .................. | 725/131 |
| 5,745,126 A * | 4/1998 | Jain et al. | .................. | 382/154 |
| 6,072,504 A * | 6/2000 | Segen | .................. | 345/474 |
| 6,144,375 A * | 11/2000 | Jain et al. | .................. | 715/251 |
| 6,980,690 B1 * | 12/2005 | Taylor et al. | .................. | 382/154 |
| 7,065,711 B2 | 6/2006 | Hata et al. | | |
| 7,519,223 B2 * | 4/2009 | Dehlin et al. | .................. | 382/203 |
| 8,232,990 B2 * | 7/2012 | King et al. | .................. | 345/419 |
| 2003/0012410 A1 * | 1/2003 | Navab et al. | .................. | 382/103 |
| 2004/0175680 A1 | 9/2004 | Hlavac et al. | | |
| 2004/0223055 A1 * | 11/2004 | Ikeuchi et al. | .................. | 348/148 |
| 2006/0028548 A1 * | 2/2006 | Salivar et al. | .................. | 348/143 |
| 2008/0231926 A1 * | 9/2008 | Klug et al. | .................. | 359/23 |
| 2009/0109180 A1 * | 4/2009 | Do et al. | .................. | 345/173 |
| 2009/0150802 A1 * | 6/2009 | Do et al. | .................. | 715/757 |
| 2009/0262196 A1 * | 10/2009 | Salivar et al. | .................. | 348/159 |
| 2010/0315413 A1 * | 12/2010 | Izadi et al. | .................. | 345/419 |

FOREIGN PATENT DOCUMENTS

| | | |
|---|---|---|
| WO | WO 03/058518 A2 | 7/2003 |
| WO | WO 2007/098560 A1 | 9/2007 |

* cited by examiner

*Primary Examiner* — Aaron W Carter
(74) *Attorney, Agent, or Firm* — H. Daniel Schnurmann

(57) ABSTRACT

Arrangements are disclosed herein that can capture image data reflecting real world objects and/or interactions and convert this data into a format that is usable in a virtual universe (VU). In one embodiment, a method can include receiving sets of image data that capture an object or a setting from different viewing angles. The image can be in multiple data sets where the sets have at least one common feature. The image data can be analyzed using the common features in the image data and a spatial map can be created. The spatial map can be modified (if required) such that a VU engine can use the modified data to provide a VU that has a representation of the real world object and/or interaction. This allows a participant to customize objects and/or activities in the VU, and provide a unique "persona" for their avatar and their VU.

17 Claims, 3 Drawing Sheets

CONVERSION OF TWO DIMENSIONAL IMAGE DATA INTO THREE DIMENSIONAL SPATIAL DATA FOR USE IN A VIRTUAL UNIVERSE

FIELD

The present disclosure relates generally to a virtual universe (VU) and more particularly to arrangements for converting two dimensional image data into three dimensional spatial data for use in a VU.

BACKGROUND

Operating in a VU utilizing a computer is a pass-time that is gaining popularity. Generally, a VU is an interactive simulated environment accessible by multiple users who can interact through an "online" interface using a network client. One deficiency with VUs is that the surroundings and items in the virtual environment are not easily customized to a user's desire and as a result virtual places and virtual interactions are limited.

One deficiency with VU's is that the environment and items or objects in the environment are generally fixed within certain parameters set by the VU service provider. However customization of objects and surroundings/environments may be created when a user builds the item into the VU. The abilities to build objects and landscape an environment are skills that a user must develop according to the options and parameters of a particular VU. Thus, the creation of new objects and environments can require significant skills and can take considerable development effort and time on the part of the user. This effort and time will vary accordingly to the user's ability and experience with object creation. Thus, customization of the VU to what a user may want is less than perfect. It is worth noting that while a user is involved in the creation of an object or environment, their level of interaction within the VU can drop significantly. In VUs such as Second Life, other avatars can see that a user's avatar is in the process of building in the VU. (Second Life is a trademark of Linden Research in the United States, other countries, or both). The Second Life client program provides its users (referred to as residents) with tools to view, navigate, and modify the Second Life world and participate in its virtual economy. Second Life and other on-line VUs present a tremendous new outlet for both structured and unstructured virtual collaboration, gaming, exploration, advertising, and travel, as well as real-life simulations in virtual spaces.

Such an effort to customize the VU typically takes away a certain area of space around the avatar that is building in the VU. Other avatars may be less likely to chat or approach this avatar to initiate interaction. Likewise, the avatar, controlled by the user, may be busy with the task at hand of building an object or environment and thus are less likely to leave their physical position in the VU to initiate interaction.

User friendliness of computers continues to be enhanced by better user interfaces. User interfaces for computers systems have evolved significantly since the personal computer (PC) first became widely available. Early PCs used rather primitive user input devices, where a single keyboard was the only human input mechanism. The vast improvement in microprocessors, available memory, and programming functionality have all contributed to the advancement of user interface designs and the development of user friendly graphic based operating systems and hardware. In addition, interfaces for moving vast amounts of data into, or out of a personal computer and across a network have also improved.

One particular area of advancement in user interface technology pertains to surface computing technology. Surface computing allows any number of users to interact with a computer through an interactive surface. The computer can render a graphical user interface ('GUI') on the surface and multiple users may manipulate GUI displayed "objects" directly with their hands using multi-touch technology as opposed to using traditional input devices such as a mouse or a keyboard. In such a manner, the devices through which users provide input and receive output are merged into a single surface, which provide an intuitive and efficient mechanism for users to interact with the computer. As can be appreciated the combined software and hardware technology of the interactive surface can allow a user, or multiple users, to manipulate digital content by the use of natural motions, hand gestures, or physical objects.

As surface computing becomes more ubiquitous in everyday environments, readers will appreciate advancements in how users may utilize surface computing to intuitively and efficiently perform tasks that may be cumbersome using traditional input devices such as a keyboard and mouse. More specifically in this case, the advancement pertains to the detection of something near an interactive surface, which is sometimes referred to as proximity detection. Generally, as applied to user interfaces, proximity detection is thus concerned with the detection of multiple objects, including inanimate objects, persons, and/or various gestures through the use of a user's hand or finger, for example, when in proximity of a user interface or surface. Such a system is commonly referred to as a multi-touch interactive system. Such a system can include a touch screen or touch tablet (touchpad) that recognizes multiple simultaneous touch points and typically has software to interpret such simultaneous touches.

There are several detection technologies that may be utilized for detection of devices by a multi-touch surface. Various optical type detection systems can be utilized by a multi-touch surface. Optical-based proximity detection techniques have been developed that provide for illuminating an entire user interface surface with light and employ a digital video camera to recognize objects that are either in contact or proximate to a graphic display surface, based upon the light reflected from the objects.

With regard to virtual universes, users can inhabit and interact in the virtual environment via avatars, which can be two or three-dimensional graphical representations of human or non-human form. Alternately described, an avatar can be a graphical representation that a user selects for others to see while in the same virtual environment. An avatar can assume various graphical representations such as that of a human character, animal character, an icon, abstract personas, and so on.

Virtual environments have many different names. For example, a virtual environment can be referred to as a "metaverse," a "3D Internet" a virtual world, and so on referred to herein as a virtual universe (VU). Although there are many different types of virtual environments, there are several features many VUs have in common. For example, many VUs have shared space which is a "universe" that allows many users to concurrently participate in an activity. The VU residents/avatars can traverse, inhabit, and interact with other avatars via 3-D graphics and landscapes. An avatar often referred to as "humanoid" can have a wide range of business and social experiences while interacting with the VU. Such business and social experiences are becoming more common and increasingly important in on-line VUs. Thus, a VU can be populated by many thousands of residents or avatars where each avatar can have user customized attributes.

An agent can be a user's account, upon which the user can build an avatar, and which is tied to the inventory of assets the user owns. A region can be a virtual area of land within the VU, typically residing on a single server. Assets, avatars, the environment, and anything visual can have UUIDs (unique universal identifier) that are associated with geometric data, among other data. The geometric data can be distributed to users as textual coordinates. Textures can be distributed to users as graphics files, which are placed within the boundaries of specified textual coordinates. Effects data can be rendered by the user's client according to the user's preferences and user's device capabilities. Lastly, socialization and/or community features allow and encourage the formation of social groups such as teams, guilds, clubs, cliques, housemates, neighborhoods, etc.

Avatars or residents can be personas or representations of the users of the VU, and residents can roam all about the virtual region by walking, driving, flying, or even by teleportation or transportation, which is essentially moving through space from one point to another in the VU, more or less instantaneously. The VU can also include things that do not presently exist in real life. An avatar can have a wide range of business and social experiences while interacting with the VU. Such business and social experiences are becoming more common and increasingly important in on-line VUs.

Many VUs also have a graphical user interface (GUI). The GUI can depict the VU or some form of "space" visually, ranging in style from 2D "cartoon" imagery to a more immersive 3D environment. In addition many virtual environments provide immediacy, interactivity, and persistence. Immediacy allows interactions between a user's avatar and the environment to take place in real time. Persistence provides a continuous environment regardless of whether individual users are logged in.

Interactivity with the environment allows users to alter, develop, build, or submit customized content to a limited degree. As stated above the types of objects that an avatar can posses and the types of actions an avatar can do is limited. The ability to customize such objects, actions and gestures is also less than perfect. As stated above, what graphics are available for objects, actions and gestures in the VU is limited.

SUMMARY

The problems identified above are in large part addressed by the systems, arrangements, methods and media disclosed herein where the disclosed system can acquire image files or successive frames of image data and can process the data to provide a three dimensional model or image referred to herein as a spatial map. The spatial map can be converted to data that can be utilized, to simulate real world objects and setting or activities in a virtual universe (VU). The image data can be pixel type data. The spatial data can be placed in an appropriate location in the VU to provide an enhanced user experience. The location may be a dynamic location such as in an avatar's hand. Placement of the spatial data in the VU may include placement of an object, such as a new or modified object on an avatar possibly in an avatar's hand.

In one embodiment, a method for translating data acquired from objects, settings and activities in the real world, to data usable by a VU engine or locating data usable by the VU engine is disclosed. The method can include receiving sets of related image data. The sets of related data can include image data or image files (pictures or video) that capture objects or places from different viewing angles. Thus, the image data can include, or be separated into at least two distinct sets of data, but typically many different sets of data having at least one common feature will be acquired and analyzed by the system. The image data can be analyzed, and utilizing common features in different sets of image data, a spatial map can be created. The spatial map can be translated or modified (if required) such that a VU engine can use the modified data to provide a VU that has a representation of the real world object, setting or activity.

The method can determine placement parameters and sizing parameters such that spatial map data can be appropriately integrated into the VU. If the system does not have enough data to render the real world objects, settings, and activities then the system can conduct a search for additional related image data. Such a search can utilize keywords and tags. Although not essential in some embodiments, the image data and user input can be received by a multi-touch interactive surface. When a multi-touch interactive system is utilized, an object could be placed on a surface of the system and the interactive system could build the spatial map based on image data acquired by the system. In other embodiments the method can acquire user input to identify the object and to search for image data related to the object. Keywords could be utilized by the system to search sites on the Internet for photo sharing websites. Such a method can be automated where once the participant provides the initial input the system can automatically acquire the image data and provide it to a VU system such that it is automatically displayed on a VU client machine without any further input from the participant.

In other embodiments a system is disclosed for converting image data obtained in the real world to data usable to simulate these real world objects, settings, and activities in the virtual universe. The system can include an image data acquisition module to acquire image data that can be utilized to build a three dimensional object or setting. The system can include a feature detection module to detect at least one feature that is common to different image files or sets of image data. The system can also include a spatial map builder module to create spatial coordinate data representing the common features. In addition the system can include a conversion module to convert the spatial coordinate data to data that is usable to provide graphics in a virtual universe format.

In some embodiments the system can include an image file search engine to search for image data, a placement module to determine a placement of the converted spatial coordinate data in the virtual universe and a sizing module to make sure an object is entered into the VU in an appropriate proportion to other objects in the VU. The system can also include a virtual universe application to render a virtual universe on a client machine in response to the converter spatial coordinate data in the VU feed.

In yet another embodiment, a machine-accessible medium containing instructions which, when executed by a machine, cause the machine to perform image data acquisition and conversion operations. When executed the instructions can cause the machine to receive video or photos referred to herein as image data in multiple files, where each file contains photos of a common feature that is acquired from multiple viewing locations. The image data can be analyzed for at least one common feature and the photos can be stitched together to form a three dimensional model or a spatial map. Such spatial map data can be converted into a format that can be integrated into VU data and usable by a VU engine.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Systems, arrangements, methods and media are disclosed herein where video or multiple image data files representing objects, settings and/or a dynamic event, or any combination thereof, can be acquired and a three dimensional spatial map can generated from the multiple image files. The spatial map data that creates the three dimensional object, etc, can be converted into data that is usable by a VU engine. In some embodiments, the image files can be acquired via participant interactions with a multi-touch interactive system. The multi-touch interactive system is not essential, but just one example of a user input device, where multiple inputs could be incorporated into the system.

Thus, image data taken from real life experiences and the image data can represent real life tangible objects and experiences and the image data can be converted into data with a virtual universe engine compatible format. Accordingly, improved simulation of real world objects in a VU can be achieved. VU users and others can then view and interact in the "customized" VU that has recreated or simulated items and/or places.

Figure 1:
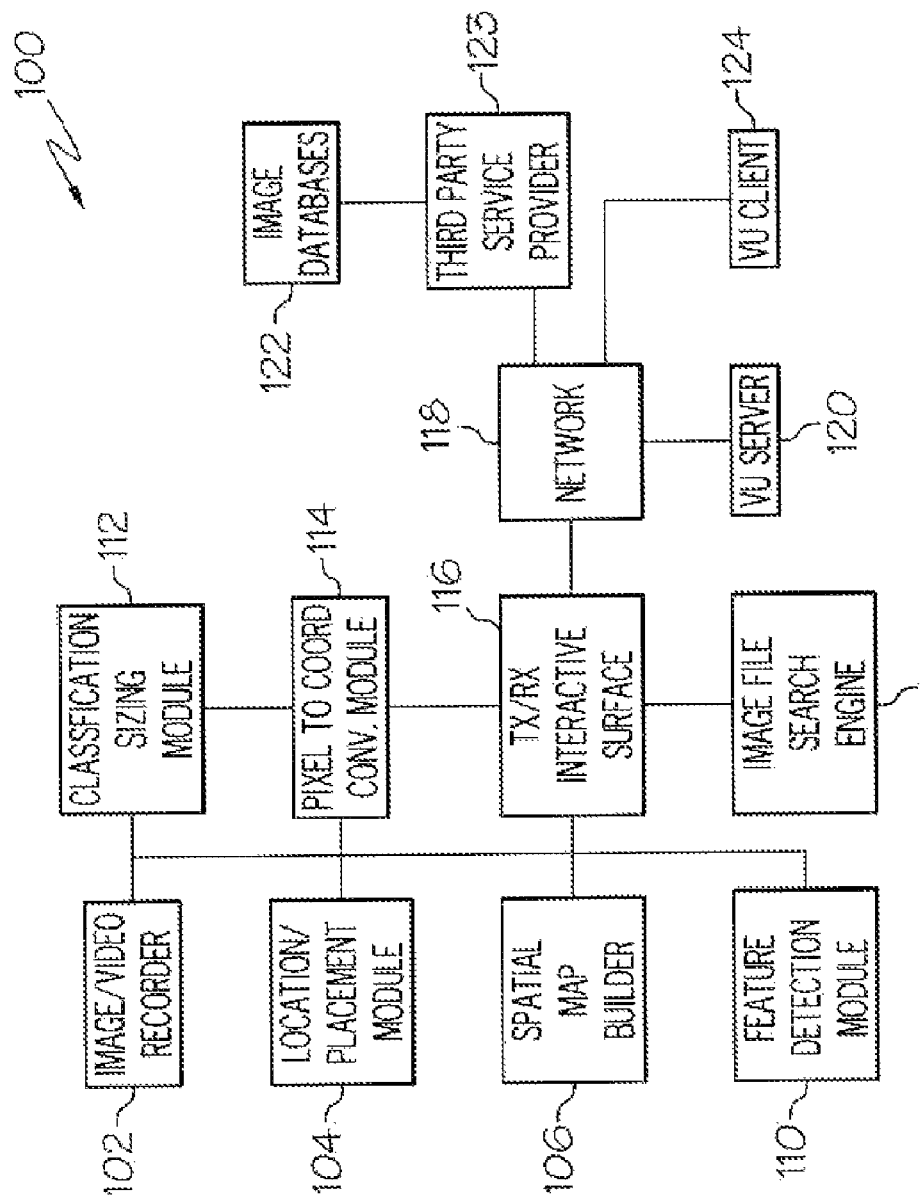
FIG. 1 is a block diagram of an image data acquisition system with a data converter.

Referring to FIG. 1 an image data acquisition/conversion system 100 is illustrated. The system can include an image/video recording device or image/video recorder 102, a location placement module 104, a spatial map builder 106, a feature detection module 110, a classification/sizing module 112, a pixel to coordinate conversion module 114, an interactive surface system with a transceiver and an image acquisition module 116, an image file search engine 117, a network 118, a virtual universe (VU) server 120, a third party service provider 123, image databases 122 and a virtual universe (VU) client 124.

Each one of the modules or elements shown could be a stand alone or integrated computing system. Examples of the computing systems may include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computers may be described in the general context of computer-executable instructions, such as program modules, being executed by a computer. Generally, program modules include routines, programs, objects, components, logic, data structures, and so on, that performs particular tasks or implements particular abstract data types. The computers may be practiced in distributed computing environments where tasks are performed by remote processing devices that are linked through a communications network. In a distributed computing environment, program modules may be located in both local and remote computer storage media including memory storage devices.

In operation, the system can acquire image files in many different ways. For example cameras or scanners as part of the image acquisition system 116 can acquire images. In other embodiments, image/video recorder 102 can acquire video files. In addition, the image acquisition system 116 can acquire such files and image file from the image video recorder 102 or from image data bases 122 via the image file search engine 117, the network connection 118 and third party service provider 123. The image files can be multiple photographs taken of the same area or of the same object or can be video where the video can be separated into an image file.

Data from each photograph, frame, or image file can be analyzed by feature detection module 110 for specific features such that the image files can be "linked together" using common features. For example, pictures taken in a particular room in a castle may have a corner of a window frame or a door handle or another object with a specific color that can be recognized as the same object (same feature) in different image files. Image files that share common features can be linked together by spatial map builder module 106 to form a three dimensional model of a place or an object. Pattern recognition techniques implemented by the feature detection module 110 can compare and relate features or portions of images to identify points where similarities exist and build the spatial map based on these points. In some embodiments a location where each photo was taken can be identified such that a "relative" location of where each photo was taken can be utilized to create the spatial map.

Such data can then be utilized to convert the multiple related images into a three dimensional model or a spatial map. When the same or similar features are found in multiple images, the spatial map builder 106 can calculate a three-dimensional position of the feature and the three dimensional shape of the feature. Such a position can be calculated by triangulation techniques and extrapolation techniques to name a few. Such a calculation can also include estimating unknown coordinates by extending or projecting the coordinates from the known values of the two images.

The three dimensional rendering from multiple two dimensional image files by the spatial map builder 106 can create a "cloud" of points showing where objects or features of the setting reside in space. This modeling provides data that when rendered according to a moving virtual location can show a particular area from various viewing angles including a three hundred and sixty degree sweep. Such a rendering can be based on the different angles found in the photos much like a three dimensional computer aided design drawing. While the process may be able to create the spatial map with only two photographs or image files, generally the more photographs or image files provided to the spatial map builder 106 for processing, the higher the quality of the spatial map the spatial map builder 106 can create. Accordingly, a higher quality VU can be created by the VU server 120 when the VU server is provided with a higher quality spatial map. One tool that could be utilized for processing at least part of the acquired image data is a product known as "Photosynth." Photosynth is a product and trademark of Microsoft Corporation.

In some embodiments, an object can be placed on the multi-touch interactive surface of the image acquisition system 116 and multiple photos can be taken of the object by the system 116. The photos can be "stitched" together by the spatial map builder 106 to make the three dimensional model of the object. The pixel to coordinate conversion module 114 can assist in making a translation from the data representing the photographed tangible, real world object before it is processed by the spatial map builder 106. Thus, processing of the related image data files by the spatial map builder 106 can take a large collection of photos of an object, a place or an activity and based on inputs from the feature detection module 110 (location of optical similarities), can build the spatial map, can convert the data to model the real world object, and can integrate the setting or activity in the three-dimensional coordinate data created by the VU server. Such a reconstruction of the real world in a VU can allow a user to "walk through" or "fly through" a three dimensional scene and thus, experience seeing a place or an object from any angle in a VU.

Thus, actual or real world objects and settings can re-created in a VU by acquiring multiple images files of the object and setting then generating or creating a "spatial" map of the object or setting within the boundaries of the VU. It is desired to have an extensive collection or set of photos of the object or setting to create a distinctive three dimensional model of the setting/object to be re-created. When a comprehensive collection of image files does not exist, image file search engine 117 can provide a lookup function that locates other image data that can supplement data that is provided or acquired by the system 100.

A spatial map can be built regardless of the resolution of the photo, as resolution of a photo can be improved by the spatial map builder 106. For example, the image data may be 100 megapixels or 10 gigapixels in size and in accordance with digital signal processing, data can be parses out or additional data can be generated, to increase the resolution of the image file. In another embodiment, a user can select features of the system such that the user can see where each picture was taken in relation to other related pictures.

In one example, a user could visit an amusement park and could take extensive photographs or could take video while enjoying a ride at this park. The user can utilize the system 100 to simulate the experience that they had, such as riding on a ride at the park via the VU client 124. After acquiring the video, the user could place their camera on the multi-touch interactive surface 116 and the digital images or video stored by the camera can be downloaded to the system via a transmitter and a receiver. In some embodiments, the digital images can be extracted from a camera sitting on the surface of the image acquisition system 116 and transmitting in a wireless mode. The surface could receive the image data and store the image data in memory. The translation of image data to coordinate data (to be utilized by VU server 120) can be done by feature detection module 110, spatial map builder 106 and conversion module 114. Feature detection module 110 can find the similarities in the image files and the feature detections can be utilized by spatial map builder 100 to "stitch" together the data to build the three dimensional map (coordinates in three dimensions) that can be utilized to generate the VU by the VU server 120. Once the three dimensional coordinates are generated, the user (and her avatar) can use the VU client 124 to "step" into the VU amusement park and experience a ride much like the user did in the real world, earlier in time.

It can be appreciated that the more data or image, files that can be provided by the participant, the higher the quality that the VU client 124 can provide. In the case where the data from the user is insufficient to formulate the three dimensional model needed by the VU, many different operations could be conducted. For example, the images available from the user could be compared to images available from others that have similar content by searching the Internet for such data. In some embodiments, an image database 122 residing on a remote server 122 could contain thousands of similar photos possibly of the same amusement park. To relate such photos, or image files tags (keywords) could be utilized much like "meta-tags." Also the image files could be assigned a latitude longitude coordinates as to where on the earth the photo was taken. In addition, image files could be associated with location on a world map.

Meta-data could be utilized to organize and search the image databases 122 to find related photos/image files. Generally, an image database 122 can be provided by an online third party service provider 123 such that sufficient image data can be located to assemble an acceptable spatial map containing sufficient data for use by the VU server 120. After the spatial rendering process has been completed by the spatial map builder 106, the rendering of the object or a setting can be composed of a combination of the user provided image data and the image data downloaded from the image database 122. Depending on the level of "realism" desired, the resolution or quality of viewing that the user wishes to have between the real world and the VU the quality of the spatial map can be checked against a user setting to determine if the VU compatible data should be sent to the VU server 120.

The Image acquisition system 116 may not have an interactive or a multi-touch interactive system and may be a simple communications port. In some embodiments the image databases 122 can be proximate to the interactive surface of the image acquisition 116 or the image data bases could be remotely located and operate as a pay for use service provider. In some embodiments, the image databases 122 could be an external "social" networking site such as the site provided by "Flickr.com" Such a social website can assist a participant in managing photos or image data that's accessible to the multi-touch interactive surface of the image acquisition system 116. Thus, based on a user command, or a recognition by the system 100 that an inadequate amount of image exists to render a spatial map with a high enough quality, the image file search engine 117 can search many locations for image files.

In some embodiments, a participant can select/that the avatar shadows actions of the participant as the interactive surface acquires image data. For example, a VU session can be displayed on the multi-touch interactive surface in a restaurant, and the participant can be interacting in the VU with an avatar via a pointing device and the multi-touch surface of the image acquisition system 116. The participant can order a beverage and the beverage could be placed on the multi-touch interactive surface by a waitress. The beverage can be associated with the participant and the participant's avatar and a representation of the "same" beverage that is placed on the surface can appear in the avatar's hand in the VU. Thus, image data based on real world activities can be translated into a data format that can be rendered in VU.

It can be appreciated that a participant's real life activities in a restaurant can be transferred "loosely" to a VU environment based on predetermined set of rules on how to acquire, supplement and render image and/or graphical data in response to activities that are being conducted by the participant/avatar. Accordingly, video of a participants actual experience in a social setting, such as a restaurant setting, can be acquired through image/video recorder 102 or other means and such image data or video data can be converted by spatial map builder 106 into spatial coordinate data usable by a VU server 120 to create a VU feed having graphics that represent at least some characteristics of the real life restaurant.

In another example, a participant can take pictures of her "adventures" to a restaurant on numerous occasions and store the files and tag the files with the name of the restaurant. This way over a period of time, a portfolio of photos for a particular place can be acquired. These tagged files or portfolio can be used by the spatial map builder 106 to model in three dimensions the restaurant and drinks that can be carried by the avatar in the restaurant. As stated above, and according to the predetermined rules of finding data, by the image file search engine 117, when the system does not have enough data to render a three dimensional spatial map of a predetermined quality, the image file search engine 117 can locate additional image data, either locally or remotely to complete such a spatial mapping process.

In one example, the drink placed on the surface may be a can of diet Coke. A digital image file of a can of diet Coke can be acquired from many sources including an advertising website on the Internet. Such an image file (possibly with many formats bit map etc.) can be acquired by the system 100 and utilized by the spatial map builder 106 and possibly the pixel to coordinate conversion module 114 to provide data to the VU server 120. The spatial map builder 106 can determine if there are "missing pieces" or unacceptable gaps in the image file data when the spatial map is being built. If there is insufficient data the spatial map builder 106 can activate the image search engine 117 to search for additional related image data.

The missing pieces can be acquired in many ways. Many different types of Internet sites could be utilized by system 100, to acquire image data for an entire VU object or setting or to acquire supplemental or missing data. In some embodiments, using keywords and tags, possibly meta-tags, the image file search engine 117 can locate the all inclusive/missing image data by referencing collections of photos available via an online search or service as illustrated generally by image databases 122. In these embodiments an online photo sharing service provider could store the image databases 122. In other embodiments the image databases 122 could reside on the client machine. On-line photo sharing service providers such as one found at Flickr.com could be utilized to locate a photo (image file) or a series of photos (image files). According to the above example, these files could be utilized to provide the spatial model of the can of Diet Coke.

Depending on the quality and sufficiency of the available data, thousands of image files could be searched and feature detection module 110 could determine if locate image files have the requisite data to "stitch" together an acceptable three dimensional spatial map. It can be appreciated that searching thousands of photos could provide a high quality rendition of an object or environment to formulate the three dimensional spatial representation.

In another embodiment, if a participant does not have a preference on whether the avatar had the exact drink in hand as possessed by the user, the participant could select a complete lookup of available beverages (a laundry list) via a graphical user interface on the multi-touch interactive system. Utilizing a pointing device, the participant could select and/or assign a particular beverage or beverage container to the avatar. In this embodiment, the participant can decide not to reference or provide any "personal" or local image files but instead, can invoke the lookup process for a list of image files containing different types of beverages or beverage containers.

For example, the user could type in or select a keyword or tag such as a "tropical fruit drinks." The image file search engine 117 could also generate and provide synonyms to enhance the search. The image file search engine could utilize these keyword or tag to locate related image files from the third party service provider 123 having image databases 122 such as the one found at Flickr.com. Thus, in response to participant input, the system can automatically provide a VU that "shadows" actual participant conduct and provides the ability to use real-time activity to initiate action for an avatar in VU environment.

Third party photo sharing servers 123 containing image databases 122 allows "photo submitters" to categorize digital images by use of keywords also known as "tags." These tags are a form of metadata, (data about data) which allows image file search engine 117 to find an image field. If the object is only a portion of the entire image file the spatial map builder 106 could "crop" the image or only utilize the portion of the image file that represents the desired object/setting. In some embodiments, the image databases 122 can provide "tag clouds" which provide access to images tagged with "the most popular" keywords. Because these third party servers 123 can support user-generated tags, these servers 123 often utilize "folksonomy." Thus, image file search engine 117 could download folksonomy parameters from the image databases 122 and could make such a list available to the participant for a particular image database 122 either automatically or based on a user request.

Folksonomy can be defined as an Internet-based information retrieval methodology consisting of collaboratively generated, open-ended labels that categorize content. Accordingly, folksonomy generally, can be a user generated taxonomy used to categorize and retrieve Web pages, photographs, Web links and other web content using open ended labels called tags. Folksonomy allows users to classify and categorize data on the web through collaborative efforts from the online community. This process is commonly known as (though not strictly synonymous to) "tagging." Thus a group of Website users who submit image files (photos) can cooperate to organize information that describes content of photos that they place in the database where the tags supports Website search engines. Some of these systems can organize the tags or keywords into categories for quicker and easier searching.

Some image file sharing websites represented by (third party service provider 123) such as the one provided at Flickr.com allows users to categorize their photos into "sets", or groups of photos that fall under the same heading. For example, photos taken at the Grand Canyon can be tagged with the word Grand Canyon and possibly with a specific location where the photo was taken such as "north rim." However, such organization of these "sets of files" is more flexible than the traditional folder-based method of organizing files, as one photo can belong to one set, many sets, or none at all. This concept of loose relationships is analogous similar to the "labels" provided in email programs such as the one provided by Google's as part of its Gmail service. The "sets" currently provided by, Flickr.com represents a form of categorical metadata rather than a physical hierarchy of data. A retrieval system compatible with such organization could be implemented by image file search engine.

In other embodiments sets of photos or image data can be grouped into "collections", and collections can further be grouped into higher-order collections thus, providing a greater resolution and more efficient search process. Photo sharing services such as third party service provider 123 can provide a fairly comprehensive web-service application programming interface (API) that can allow image file search engine 117 to communicate with the photo sharing server or third party service provider 123. Third party service provider 123 could allow the image file search engine 117 to create an application on the third party server 123 that can perform functions such as special searching routines.

Thus, feature detection module 110 could assist the search of the image databases 122 (in coordination with image file search engine 117), for features using feature recognition routines. Thus, the image files search engine and the feature detection module could operate as an API on the third party service provider's website. In some embodiments, computer instructions that specialize in organizing image files can be performed by a third party service provided 123. For example "Organizer" is a web-based application the participants could utilize to organize and access photos within an account provided for website services such as the services provided at Flickr.com. Image file organizational software provided by a photo sharing website, can allow users to modify tags, photo descriptions, keywords, to provide categories, classification and set groupings, and to place photos on a graphic of a world map. This feature is currently provided by the website located at Yahoo.com at Yahoo maps.

Such image file organizational tools can use supporting such as an asynchronous Java Script tool and extensible mark-up language (XML) referred to as AJAX. Even though AJAX typically resides on, and operates on the server to process data in the image databases 122, AJAX can closely emulate the look, feel, and quick functionality of desktop-based photo-management applications that would reside on a client machine. Generally, AJAX is a web development technique that can be utilized to facilitate interactive on-line applications. In accordance with some embodiments, such ah automated image file organizational tool could be provided by the third party service provider 123. A remotely located image file organizer could improve the organization of photos at a remote location. For example, an accurate map that has locations that can be accessed by names of places on the earth could be utilized to acquired additional photos of the place as requested by image file search engine. Third party service provider 123 could also provide both private and public image file storage. A participant that uploads image files can set privacy controls that determine who can access, view and retrieve the image. The photo sharing service provider 123 can use a "Geo microformat" on the pages and can provide tens of millions of geotagged images. As stated above assembly of the spatial map can include object and shape recognition software. In addition assembly of the spatial map can include computational association of binary large object (BLOB) information, and metadata processing at a large scale and content and statistical recognition routines. BLOB can be understood as a collection of binary data stored as a single entity in a database management system.

It can also be appreciated that without proper treatment, the digital representation of objects as photos when they are placed into a VU can appear as though they "do not fit." In other words, the object can be, or seem to be distracting or out of place to the viewer. For example, if the object does not have the appropriate size, color, depth etc it can be distracting to a viewer. Accordingly, the location placement module 104 and the classification/sizing module 112 can provide an improved user experience and improved arrangements for customizing how objects look in a VU or for entering customized objects into the VU. The classification/sizing module 112 can provide features to making new or altered objects look "normal" such that the objects do not draw attention to any awkward peculiarities. Such awkwardness can result from how the data representing the object is acquired and how it is processed.

Figure 2:
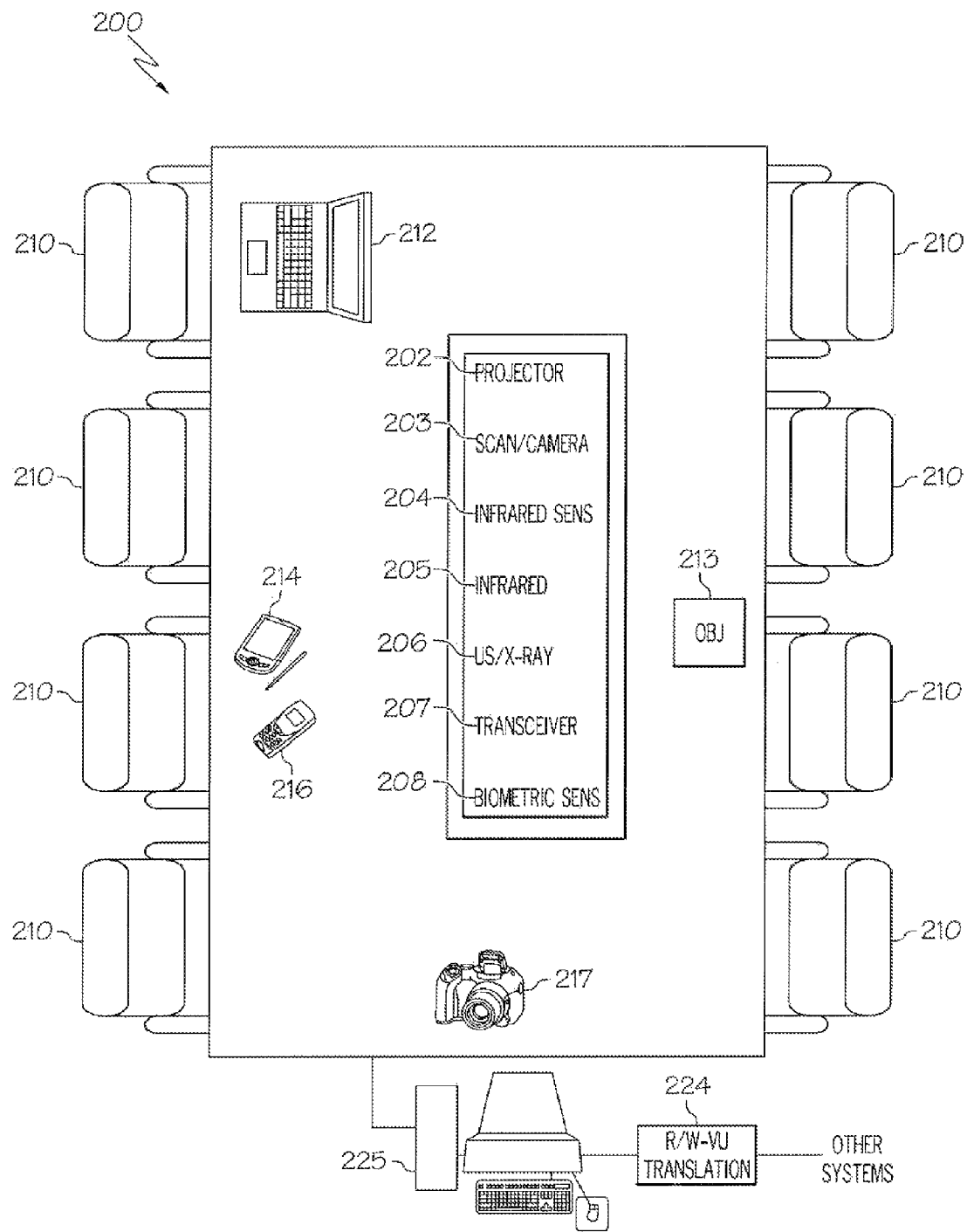
FIG. 2 is a top view of a multi-touch interactive surface table with objects and participants.

Referring to FIG. 2, a top view of an interactive surface system 200 with participants 210 sitting around the interactive surface of the multi-touch interactive surface system 200. Although the interactive multi-touch surface system is not required it provides embodiments to acquire image data. The system 200 can include many data acquisition modules that can acquire or produce image data. Image acquisition modules can include a projector 202, a camera 204, an infrared sensor 205, and ultrasound/X-ray module 206 to name a few (referred to herein as image data acquisition modules (202-206). The image data acquisition modules 202-206 can be connected to a surface computing module 225 and to real world to virtual World data translation module 224. Participants 210 can provide objects and/or actions and the system 200 can capture data that represents these objects and/or actions.

In some embodiments, the interactive surface 200 does not need to know specifics of the participant 210 and can be concerned only with an object, entity or thing associated with the participant 210 such as laptop computer 212, object 213, personal digital assistant 214, mobile phone 216, camera 217, or any object herein referred to as objects (212-217). The personal laptop computer 212, personal digital assistant 214 mobile phone and camera/video recorder 217 can all contain image data that can be downloaded to the system 200 via transceiver 207. Proximity between the participant location and the object can be utilized to link the object or device to a participant 210. Image data can be acquired by scanning the object and comparing the acquired image data to a library of image data. In other embodiments the object may be recognized by reading a barcode on the item.

Thus, attribute acquisition modules 202-208 can acquire image data representing objects, settings and activities in the form of pictures, video, infrared, ultra sonic and X-ray scans and such data can be used to render objects, settings and activities in the VU. Multi-touch interactive surface system 200 can take the form of the multi-touch "Surface table," a product available from Microsoft Corporation. Surface table is a trademark of Microsoft Corporation. Such a table can have the ability to display graphic images and exchange information between multiple participants 210 and between multiple participant devices. Such a table can provide a graphical user interface to a participant such that the participant can control operations of the surface computer 225. It can be appreciated that the interactive display surface need not be in the form of a horizontal table top. The principles described in this description suitably also can include and apply to multiple display surfaces or display surfaces having different shapes and curvatures mounted in orientations other than a horizontal orientation.

The data entry process could be menu driven on a graphical user interface provided by the multi-touch surface. For example, a participant could request a real world to virtual world conversion, and in response the surface table could acquire a relative position of the participant at the table. Then, the GUI could prompt the user for a type of input such as an object input, a gesture input, an action input or an object-action type input. Interaction with the GUI may allow a participant to set up the system 200 to scan a photo or scan an object in three dimensions. In another configuration, the GUI can be utilized to create image files for gestures such as facial expressions, arm, finger, or hand movements proximate to the surface such that the surface can obtain a digital interpretation of the action/gesture. Actions could include waving, tapping, thumbs up sign, and OK hand signal etc. Facial expressions can include a smile, a frown, a surprise, fright etc.

In some embodiments, the participant can set up the multi-touch surface up, via the GUI, to scan or recognize items. The surface can associate the items with a participant and can associate the item with the participant's avatar. Thus, actions and objects detected by the multi-touch surface can be associated with the identified participant and the participant's avatar, if applicable. In some embodiments, the surface could communicate with a camera proximate to the surface (possibly a wireless camera) and a participant could select a photo that has been downloaded from the camera and the participant could select an object that appears in the photo. Such a selection could be done by displaying the pictures on the surface and then allowing the user to place his or her finger on the object in the photo to select an object in a picture. The object recognition module could use edge detection and color detection and other digital processing techniques to render the spatial map.

The image data that is acquired by the surface can be translated by RW-VW translation module 224 into a data format that compatible with a VU server input format. Such a format may include coordinate type data. Then, the VU server can simulate, or incorporate the acquired actions and/or objects in a VU that is displayed to a user by a VU client on a personal computer. Alternately described, selected objects, interactions of the participants with objects, and activities or gestures made by a participant can be replicated in a VU. The acquired object/activity can be associated with a particular virtual area or an avatar in the VU based on a participant configurable setting.

The surface table can accept many inputs at any given time, and thus, can associate the acquired object or action with a participant and can, in some embodiments determine which objects or body parts are under the control of a participant. In one embodiment, an object placed on the surface proximate to a location that has been allocated to the participant can be considered as "under the control of the participant." Then this object can be "replicated" as close as possible in the virtual environment in relation to the participant's avatar. If the object is an object that is commonly carried by a person the system can assume that the participant wants her avatar to be carried by the avatar.

In some embodiments, the VU can be displayed to participants on the surface. The surface can also have a sub-window of a GUI that allows the user to select objects, manipulate objects and place the object into desired locations. For example, participants can select and/or can be provided with a restaurant setting VU. Via the GUI, the participants can create virtual personas/avatars at the table or load their own existing character by injecting object, actions and gestures into the VU.

In some embodiments, the GUI can provide a menu of objects or of object classifications and the participant could select an object and point to a location in the VU and the object could be placed in the VU. The participant could also, dictate if the added object moves with the avatar as a possession of the avatar or is placed on a wall or a table within the VU.

In other embodiments, the participant could select an object type via the GUI then place a photo or an actual item on the surface, wherein the surface could acquire digital image representing the object and based on this input the system could classify the digital image of the object into a category. Knowing what category the object falls into could be utilized by the system place the object into the VU. The system could also perform additional image processing to make the new object look as though it "belongs" in the VU. One form of image processing could be to scale the object to the appropriate size for the VU. In one embodiment, the user could select the size of the object to be inserted into the VU. This feature could be provided after object was inserted into the VU and the user could see if the object is of is not the desired size.

Accordingly, a user could place an object on the multi-touch surface and be prompted by a GUI displayed on the multi-touch surface as to what the object. Based on the scan of the object and the type of object the system could automatically determine where the object should be placed in the VU and the object could be simulated in the VU. In other embodiments, identifying what the item is could be done by a recognition module.

Figure 3:
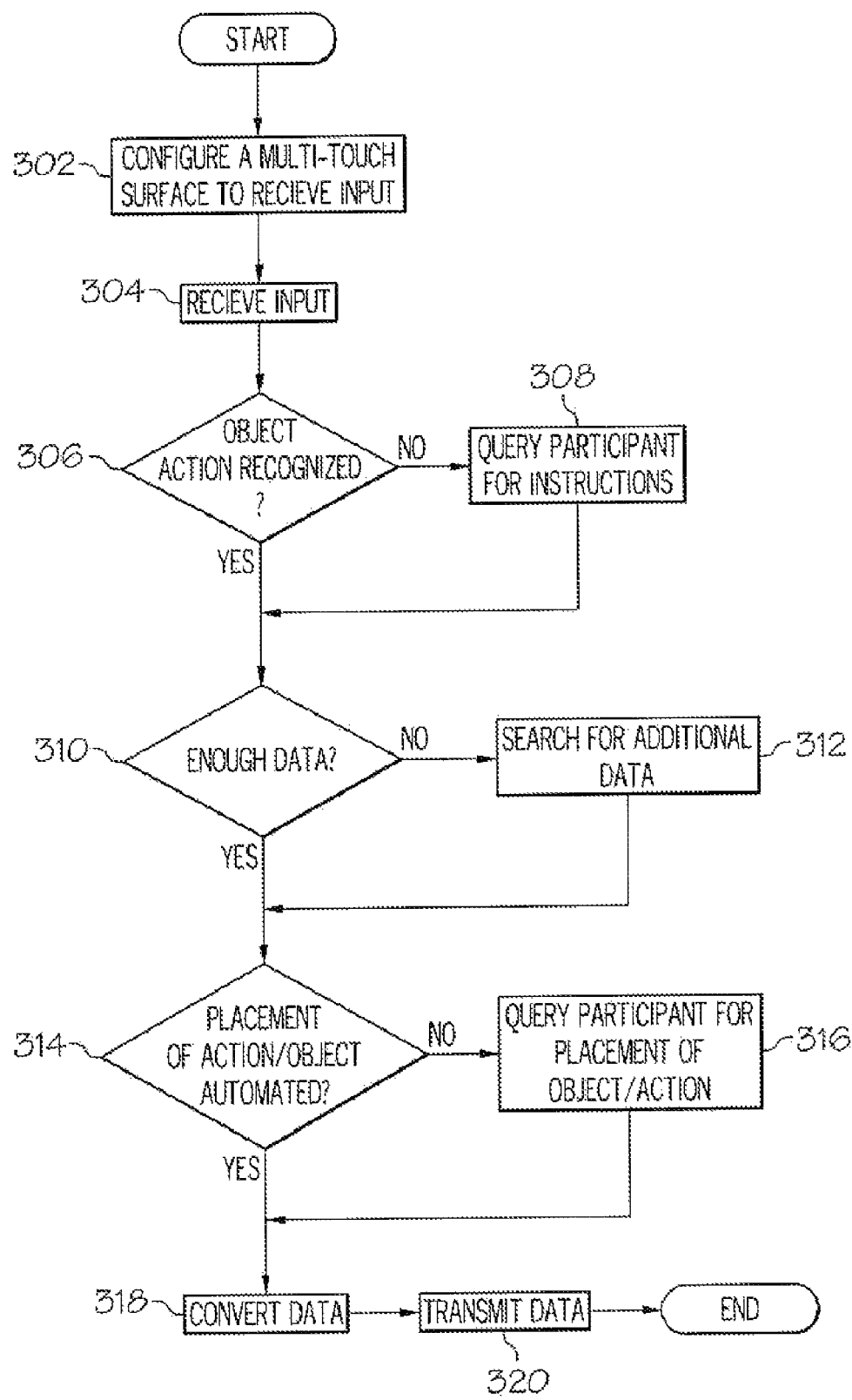
FIG. 3 is a flow diagram of a method for acquiring object, gesture, and activity data and converting such data to data usable by a virtual universe application.

Referring to FIG. 3 a flow diagram 300 is illustrated for converting real world objects/events into virtual universe objects/events. As illustrated by block 302, a multi-touch surface can be configured to receive input. As illustrated by block 304, the multi-touch surface can receive input such as various types of data that can render an image. The image data can be a series of image files that each represents a single picture or frame, or the image data can include a series of frames that can be parsed from streaming video. Thus, image data as utilized herein refers to both a picture and to video or any data that can be processed to create an image or a video on any type of display. Such data could take the form of pixel data.

As illustrated by decision block 306, the system can determine whether it recognized the action/object or gesture. If the system does not recognize the object, action, or gesture then, the participant can be queried regarding how to treat the object and/or action. For example the participant could elect to incorporate the object such as a bottle in a "life-like" location (in an avatars hand), or an abstract location, possibly placing the bottle in a frame and hanging the framed picture on the wall.

As illustrated by decision block 310, it can be determined if the system has enough data to build an acceptable spatial map. If the system does not have enough data to build a spatial map, then the system can search for additional data as illustrated by block 312. Searching could be conducted in many ways. For example, stored image data could be classified based on a location where the image originated (where a picture was taken) or what type of object is represented by the image. The system could classify, organize and search for images based on tags. Thus, if a VU participant wants an avatar to carry bottle, the participant could select a tag that could be utilized to locate and load ah image of a bottle.

As illustrated by decision block 314, the system can determine where to place the object in the VU or an automated placement algorithm could be invoked by the system. When automated placement cannot be determined, the participant can be queried as to where the object or actions should be placed in the VU as illustrated by block 316. When an object or an action and a placement for the object and/or action is/are determined, the imaged data can be converted as illustrated by block 314. The converted data can be transmitted to a VU server, as illustrated by block 318. The data can be transmitted as illustrated by block 320 and the process can end thereafter.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Reference to particular configurations of hardware and/or software, those of skill in the art will realize that embodiments may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In some embodiments the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements Can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
   acquiring image data via a multi-touch interactive surface, the image data including at least two sets of data;
   analyzing the at least two sets of data for at least one common feature;
   creating spatial map data representing the at least one common feature;
   integrating the spatial map data into a virtual universe compatible data format;
   determining placement parameters to arrange the spatial map data in a virtual universe application; and
   representing the spatial map data in the virtual universe.

2. The method of claim 1, further comprising determining size parameters for the spatial map data such that an object represented by the spatial map data is proportional to other objects in the virtual universe.

3. The method of claim 1, further comprising determining a need of additional image data and searching for the additional image data in response to determining the need.

4. The method of claim 3, wherein searching comprises searching using one of keywords or tags.

5. The method of claim 1, further comprising identifying an object and creating keywords based on the identifying of the object.

6. The method of claim 1, wherein acquiring comprises downloading image data from an image recording device.

7. The method of claim 1, further comprising creating the at least two sets of data from video data.

8. A system comprising a processor configured to:
   acquire at least two sets of image data via a multi-touch interactive surface;

detect at least one feature that is common to the at least two sets of image data;

create spatial map data representing the at least one common feature;

convert the spatial map data to data that is usable to provide graphics in a virtual universe format; and determine placement parameters for arranging the converted spatial map data in a virtual universe.

9. The system of claim 8, wherein the processor is configured to search for image data.

10. The system of claim 8, wherein the processor is configured to render the virtual universe in response to the converted spatial map data.

11. The system of claim 8, further comprising a database to provide at least one of the two sets of the image data.

12. The system of claim 8, wherein the processor is configured to record the image data.

13. The system of claim 8, further comprising a multi-touch interactive system to acquire the image data.

14. A non-transitory computer readable medium containing instructions which, when the instructions are executed by a computer, cause the computer to perform operations, comprising:

acquiring image data via a multi-touch interactive surface, the image data including at least two sets of data;

analyzing the at least two sets of data for at least one common feature;

creating spatial map data representing the at least one common feature;

integrating the spatial map data into a virtual universe compatible data format;

determining placement parameters to arrange the spatial map data in a virtual universe application; and representing the spatial map data in the virtual universe.

15. The computer readable medium of claim 14, that when executed causes the computer to determine that additional image data will improve the spatial map and to conduct a search for the additional image data.

16. The computer readable medium of claim 14, that when executed causes the computer to create at least two image files from video data.

17. The computer readable medium of claim 14, that when executed causes the computer to download image data from a recording device.

* * * * *